United States Patent
Javarone

(10) Patent No.: US 8,003,708 B2
(45) Date of Patent: Aug. 23, 2011

(54) PROCESS FOR MAKING RIGID POLYURETHANE FOAMS

(75) Inventor: Cristina Javarone, Besozzo (IT)

(73) Assignee: Huntsman International LLC, The Woodlands, TX (US)

( * ) Notice: Subject to any disclaimer, the term of this patent is extended or adjusted under 35 U.S.C. 154(b) by 506 days.

(21) Appl. No.: 11/517,103

(22) Filed: Sep. 7, 2006

(65) Prior Publication Data

US 2007/0060660 A1  Mar. 15, 2007

Related U.S. Application Data

(63) Continuation of application No. PCT/EP2005/051160, filed on Mar. 15, 2005.

(30) Foreign Application Priority Data

Mar. 15, 2004 (EP) ..................... 04425174

(51) Int. Cl.
*C08G 18/28* (2006.01)

(52) U.S. Cl. ........ 521/173; 521/130; 521/131; 521/164; 521/167; 521/172; 521/174

(58) Field of Classification Search .................. 521/131, 521/164, 167, 172, 173, 174, 130
See application file for complete search history.

(56) References Cited

U.S. PATENT DOCUMENTS

| | | | |
|---|---|---|---|
| 4,536,522 A * | 8/1985 | Grigsby et al. ............... 521/172 |
| 4,972,002 A | 11/1990 | Volkert | |
| 4,972,004 A | 11/1990 | Randall et al. | |
| 4,981,879 A | 1/1991 | Snider | |
| 5,034,424 A | 7/1991 | Wenning et al. | |
| 5,070,115 A * | 12/1991 | Welte et al. ..................... 521/173 |
| 5,238,970 A | 8/1993 | De Vos | |
| 5,470,501 A * | 11/1995 | Fishback et al. .......... 252/182.28 |
| 5,489,618 A * | 2/1996 | Gerkin ........................... 521/128 |
| 5,539,008 A | 7/1996 | Dams et al. | |
| 5,578,656 A | 11/1996 | Gillis et al. | |
| 5,684,057 A | 11/1997 | White, III et al. | |
| 5,837,743 A * | 11/1998 | Londrigan et al. ............. 521/172 |
| 5,874,021 A * | 2/1999 | Inazawa et al. .......... 252/182.25 |
| 6,316,513 B1 | 11/2001 | McCullough et al. | |
| 6,476,091 B2 * | 11/2002 | White et al. ................... 521/173 |
| 6,586,490 B1 | 7/2003 | Dietrich et al. | |
| 6,646,020 B2 * | 11/2003 | Nyberg et al. ................. 521/170 |
| 2002/0169228 A1 | 11/2002 | Riley et al. | |

FOREIGN PATENT DOCUMENTS

| | | |
|---|---|---|
| EP | 320134 | 6/1989 |
| EP | 498628 | 8/1992 |
| EP | 508649 | 10/1992 |
| WO | WO 95/18176 | 7/1995 |
| WO | WO 96/12758 | 5/1996 |
| WO | WO 02/053615 | 7/2002 |

* cited by examiner

*Primary Examiner* — John Cooney
(74) *Attorney, Agent, or Firm* — Robert A. Diaz

(57) ABSTRACT

Process for making rigid polyurethane or urethane-modified polyisocyanurate foams at an isocyanate index of between 110 and 120 comprising the step of reacting an organic polyisocyanate composition with an isocyanate-reactive composition in the presence of a hydrocarbon as blowing agent wherein the isocyanate-reactive composition contains between 3 and 30 wt % of polyester polyols and between 20 and 50 wt % of polyether polyols derived from aromatic amines, the amounts being calculated on the basis of total isocyanate-reactive compound.

18 Claims, No Drawings

US 8,003,708 B2

PROCESS FOR MAKING RIGID POLYURETHANE FOAMS

CROSS REFERENCE TO RELATED APPLICATIONS

This application is a continuation of international application PCT/EP2005/051160, filed Mar. 15, 2005, which claims priority to EP 04425174.2, filed Mar. 15, 2004, both of which applications are hereby incorporated by reference.

FIELD OF THE INVENTION

This invention relates to rigid polyurethane or urethane-modified polyisocyanurate foams and to processes for their preparation.

BACKGROUND OF THE INVENTION

Rigid polyurethane and urethane-modified polyisocyanurate foams are in general prepared by reacting a stoichiometric excess of polyisocyanate with isocyanate-reactive compounds in the presence of blowing agents, surfactants and catalysts. One use of such foams is as a thermal insulation medium in, for example, appliances.

In appliance formulations, generally, polyether polyols are used as isocyanate-reactive compounds. Polyester polyols impart excellent flame retardancy characteristics to the resulting polyurethane foams, and, hence, are generally used for building applications.

One of the most important characteristics of rigid polyurethane foam is the thermal insulation properties, i.e. the lambda value, which has to be as low as possible, especially at 10° C., when the foam is used as insulation in appliances. This low lambda value should also be reached with the nowadays used physical blowing agents, especially the hydrocarbon ones (e.g. cyclopentane).

Therefore, it is an object of the present invention to provide a process for making rigid polyurethane foams based on polyester polyols showing a low lambda value, especially at 10° C., and also that can make use of notably cyclopentane.

SUMMARY OF THE INVENTION

According to the present invention, a process for making rigid polyurethane or urethane-modified polyisocyanurate foams is provided by reacting an organic polyisocyanate composition with an isocyanate-reactive composition in the presence of an hydrocarbon as a blowing agent, characterised in that the isocyanate-reactive composition contains between 3 and 30 wt % of polyester polyols and between 20 and 50 wt % of polyether polyols derived from aromatic amines, the amounts being calculated on the basis of total isocyanate-reactive compound.

DETAILED DESCRIPTION OF THE INVENTION

A process for making rigid polyurethane or urethane-modified polyisocyanurate foams is provided by reacting an organic polyisocyanate composition with an isocyanate-reactive composition in the presence of an hydrocarbon as a blowing agent, characterised in that the isocyanate-reactive composition contains between 3 and 30 wt % of polyester polyols and between 20 and 50 wt % of polyether polyols derived from aromatic amines, the amounts being calculated on the basis of total isocyanate-reactive compound.

The term "polyester polyol" as used herein is meant to include any polyester polyol having a hydroxyl functionality of at least two wherein the majority of the recurring units contain ester linkages and the molecular weight is at least 300.

The polyester polyols for use in the present invention advantageously have an average functionality of about 1.8 to 8, preferably about 2 to 6, and more preferably about 2 to 3. Their hydroxyl number values generally fall within a range of about 15 to 750, preferably about 30 to 550 and more preferably about 180 to 550 mg KOH/g. The molecular weight of the polyester polyol generally falls within the range of about 200 to about 10000, preferably about 300 to about 2000. Preferably, the polyester polyols have an acid number between 0.1 and 20 mg KOH/g; in general the acid number can be as high as 30 mg KOH/g.

The polyester polyols of the present invention can be prepared by known procedures from a polycarboxylic acid or acid derivative, such as an anhydride or ester of the polycarboxylic acid, and any polyhydric alcohol. The polyacid and/or polyol components may be used as mixtures of two or more compounds in the preparation of the polyester polyols.

The polyols can be aliphatic, cycloaliphatic, aromatic, and/or heterocyclic. Low molecular weight aliphatic polyhydric alcohols, such as aliphatic dihydric alcohols having no more than about 20 carbon atoms, are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. A preferred polyol component is a glycol. The glycols may contain heteroatoms (e.g., thiodiglycol) or may be composed solely of carbon, hydrogen and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O_x(OH)_2$. Examples of suitable polyhydric alcohols include: ethylene glycol, propylene glycol -(1,2) and -(1,3), butylene glycol -(1,4) and -(2,3), hexanediol -(1,6), octanediol -(1,8), neopentyl glycol, 1,4-bishydroxymethyl cyclohexane, 2-methyl-1,3-propane diol, glycerin, trimethylolethane, hexanetriol -(1,2,6), butanetriol -(1,2,4), quinol, methyl glucoside, triethyleneglycol, tetraethylene glycol and higher polyethylene glycols, dipropylene glycol and higher polypropylene glycols, diethylene glycol, glycerol, pentaerythritol, trimethylolpropane, sorbitol, mannitol, dibutylene glycol and-higher-polybutylene glycols. Especially suitable polyols are-alkylene glycols-and- oxyalkylene glycols, such as ethylene glycol, diethylene glycol, dipropylene glycol, triethylene glycol, tripropylene glycol, tetraethylene glycol, tetrapropylene glycol, trimethylene glycol, tetramethylene glycol and 1,4-cyclohexanedimethanol (1,4-bis-hydroxymethylcyclohexane).

The polycarboxylic acid component may be aliphatic, cycloaliphatic, aromatic and/or heterocyclic and may optionally be substituted, for example, by halogen atoms and/or may be unsaturated. Examples of suitable carboxylic acids and derivatives thereof for the preparation of the polyester polyols include: oxalic acid, malonic acid, adipic acid, glutaric acid, succinic acid, pimelic acid, suberic acid, azelaic acid, sebacic acid, phthalic acid, phthalic acid anhydride, terephthalic anhydride, isophthalic acid, terephthalic acid, trimellitic acid, tetrahydrophthalic acid anhydride, pyromellitic dianhydride, hexahydrophthalic acid anhydride, tetrachlorophthalic acid anhydride, endomethylene tetrahydrophthalic anhydride, glutaric acid anhydride, maleic acid, maleic acid anhydride, terephthalic acid dimethylester, terephthalic acid-bis glycol ester, fumaric acid, dibasic and tribasic unsaturated fatty acids optionally mixed with monobasic unsaturated fatty acids, such as oleic acids. Phthalic acid anhydride and terephthalic acid anhydride are the preferred initiators.

While the polyester polyols can be prepared from substantially pure reactant materials, more complex ingredients can be used, such as the side-stream, waste or scrap residues from the manufacture of phthalic acid, terephthalic acid, dimethyl terephthalate (DMT), polyethylene terephthalate (PET), and the like. These compositions can be converted by reaction with polyols to polyester polyols through conventional transesterification or esterification procedures.

The production of the polyester polyols is accomplished by simply reacting the polycarboxylic acid or acid derivative with the polyol component in a known manner until the hydroxyl and acid values of the reaction mixture fall in the desired range. After transesterification or esterification the reaction product can optionally be reacted with an alkylene oxide.

The term "polyester polyol" as used herein includes any minor amounts of unreacted polyol remaining after the preparation of the polyester polyol and/or unesterified polyol (e.g., glycol) added after the preparation. The polyester polyol can advantageously include up to about 40% by weight free glycol. Preferably, the free glycol content is from 2 to 30, more preferably from 2 to 15% by weight of the total polyester polyol component.

Aliphatic and/or aromatic polyester polyols can be used according to the present invention. Aromatic polyester polyols based on PET or DMT are the most preferred ones leading to even lower energy consumption.

Mixtures of two or more different polyester polyols may be used.

The polyester polyol used in the invention can be easily selected from the polyester polyols available on the market or those that can be prepared in know manners, or those that will become available.

The isocyanate-reactive composition contains between 3 and 30 wt % of polyester polyols, preferably between 10 and 20 wt %, based on total isocyanate-reactive compounds.

The isocyanate-reactive composition further contains between 20 and 50 wt %, preferably between 25 and 40 wt % of polyether polyols based on aromatic amines, most preferably about 30 wt %.

Such polyether polyols are reaction products of alkylene oxides, for example ethylene oxide and/or propylene oxide, with aromatic amine initiators containing at least 2 active hydrogen atoms per molecule. Suitable aromatic amine initiators are tolylene diamine, diaminodiphenylmethane and polymethylene polyphenylene polyamines (DADPM); especially DADPM is preferred.

These polyether polyols generally have hydroxyl numbers in the range 250 to 1000, especially 250 to 600 mg KOH/g.

A particularly preferred aromatic amine initiated polyether polyol is a DADPM based polyether polyol of OH value about 500 mg KOH/g.

Further isocyanate-reactive compounds can be used together with the polyester polyols and aromatic amine based polyether polyols.

The additional isocyanate-reactive compounds which can be employed in the preparation of the rigid polyurethane foams of the present invention include any of those known in the art for that purpose, such as polyether polyols. Of particular importance for the preparation of rigid foams are polyols and polyol mixtures having average hydroxyl numbers of from 300 to 1000, especially from 300 to 700 mg KOH/g, and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine; and aminoalcohols, for example ethanolamine and diethanolamine; and mixtures of such initiators. Further suitable polymeric polyols include hydroxyl-terminated polythioethers, polyamides, polyesteramides, polycarbonates, polyacetals, polyolefins and polysiloxanes.

A preferred additional isocyanate-reactive compound is a sorbitol-initiated polyether polyol.

According to a particularly preferred embodiment of the present invention, the isocyanate-reactive composition contains a maximum of 20 wt % polyesters polyols, between 30 and 50 wt % aromatic amine based polyether polyol and between 30 and 50 wt % non-aromatic amine initiated polyether polyol.

Preferably, the polyester polyol in such an embodiment is PET or DMT based and the aromatic amine is DADPM.

The blowing agent used in the instant invention comprises a hydrocarbon, such as $C_4$ to $C_6$ (cyclo)alkane. Examples of preferred blowing agents include isobutane, n-pentane, isopentane, cyclopentane or mixtures thereof. The preferred blowing agent is cyclopentane (used alone or in a mixture with isopentane in a ratio cyclopentane/isopentane from 60:40 to 100:0).

Any of the blowing agents known in the art for the preparation of rigid polyurethane or urethane-modified polyisocyanurate foams can be used in the process of the present invention in combination with the hydrocarbon. Such blowing agents include water or other carbon dioxide-evolving compounds, or inert low boiling compounds having a boiling point of above −70° C. at atmospheric pressure.

Where water is used as blowing agent, the amount may be selected in known manner to provide foams of the desired density, typical amounts being in the range from 0.05 to 5% by weight based on the total reaction system. Preferably, water is used in the present invention in an amount of between 1.5 and 3 wt %, more preferably between 1.8 and 2.6 wt %, and most preferably between 2 and 2.3 wt % on total isocyanate-reactive composition.

Suitable other inert blowing agents include those well known and described in the art, for example, dialkyl ethers, alkyl alkanoates, aliphatic and cycloaliphatic hydrofluorocarbons, hydrochlorofluorocarbons, chlorofluorocarbons, hydrochlorocarbons and fluorine-containing ethers. Examples are 1,1-dichloro-2-fluoroethane (HCFC 141b), 1,1,1-trifluoro-2-fluoroethane (HFC 134a), chlorodifluoromethane (HCFC 22), 1,1-difluoro-3,3,3-trifluoropropane (HFC 245fa), as well as those described in PCT Patent Publication No. 96/12758, incorporated herein by reference (in addition to the (cyclo)alkane). Preferably however, no other inert blowing agent will be used in the present invention.

The blowing agents are employed in an amount sufficient to give the resultant foam the desired bulk density which is generally in the range 15 to 70 kg/m³, preferably 20 to 50 kg/m³, most preferably 25 to 40 kg/m³. Typical amounts of blowing agents are in the range 2 to 25% by weight based on the total reaction system.

When a blowing agent has a boiling point at or below ambient it is maintained under pressure until mixed with the other components. Alternatively, it can be maintained at sub-ambient temperatures until mixed with the other components.

Suitable organic polyisocyanates to be reacted with the isocyanate-reactive composition to form rigid polyurethane or urethane-modified polyisocyanurate foams include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic polyisocyanates which may be mentioned include the aliphatic diisocyanates such as isophorone diisocyanate, 1,6-diisocyanatohexane and 4,4'-diisocyanatodicyclohexylmethane. Further suitable polyisocyanates for use in the process of the present-invention are those described in EP-A-0320134.

Modified polyisocyanates, such as carbodiimide or uretonimine modified polyisocyanates can also be employed.

Still other useful organic polyisocyanates are isocyanate-terminated prepolymers prepared by reacting excess organic polyisocyanate with a minor amount of an active hydrogen-containing compound.

Preferred polyisocyanates to be used in the present invention are the polymeric MDI's.

The quantities of the polyisocyanate composition and the polyfunctional isocyanate-reactive composition to be reacted can be readily determined by the man skilled in the art. In general the isocyanate index falls within the range 85 to 150%, preferably about 105 to 130%, most preferably about 110 to 120%.

In addition to the polyisocyanate and polyfunctional isocyanate-reactive compositions and the blowing agent, the foam-forming reaction mixture will commonly contain one or more other auxiliaries or additives conventional to formulations for the production of rigid polyurethane and urethane-modified polyisocyanurate foams. Such optional additives include crosslinking agents, for examples low molecular weight polyols such as triethanolamine, processing aids, viscosity reducers, dispersing agents, plasticizers, mold release agents, antioxidants, fillers (e.g. carbon black), cell size regulators such as insoluble fluorinated compounds (as described, for example, in U.S. Pat. Nos. 4,981,879, 5,034,424, 4,972, 002, EP 0508649, EP 0498628, WO 95/18176), foam-stabilising agents or surfactants, for example siloxane-oxyalkylene copolymers (such as polydimethylsiloxane-polyoxyalkylene block copolymers), urethane catalysts such as non-amine polyurethane catalysts such as tin compounds (e.g. stannous salts of carboxylic acids such as stannous octoate or dibutyltin dilaurate), trimerisation catalysts (e.g. alkali metal carboxylic acid salts), tertiary amines such as dimethylcyclohexylamine or triethylene diamine, fire retardants, for example halogenated alkyl phosphates such as tris chloropropyl phosphate, triethylphosphate, diethylethylphosphonate and dimethylmethylphosphonate. The use of such additives is well known to those skilled in the art.

In operating the process for making rigid foams according to the invention, the known one-shot, prepolymer or semi-prepolymer techniques may be used together with conventional mixing methods and the rigid foam may be produced in the form of slabstock, mouldings, cavity fillings, sprayed foam, frothed foam or laminates with other materials such as hardboard, plasterboard, plastics, paper or metal.

It is convenient in many applications to provide the components for polyurethane production in pre-blended formulations based on each of the primary polyisocyanate and isocyanate-reactive components. In particular, many reaction systems employ a polyisocyanate-reactive composition which contains the major additives such as the catalyst and the blowing agent in addition to the polyisocyanate-reactive component or components.

EXAMPLES

The various aspects of this invention are illustrated, but not limited by the following examples in which the following ingredients are used:

Polyol A: a DMT-initiated polyester polyol of OH value 240 mg KOH/g.
Polyol B: a phthalic anhydride-initiated polyester polyol of OH value 235 mg KOH/g.
Polyol C: a PET-initiated polyester polyol of OH value 250 mg KOH/g.
Polyol E: a DADPM initiated polyether polyol of OH value 300 mg KOH/g.
Polyol F: a DADPM initiated polyether polyol of OH value 500 mg KOH/g.
Polyol G: a sorbitol initiated polyether polyol of OH value 510 mg KOH/g.
Polyol H: a glycerol initiated polyether polyol of OH value 250 mg KOH/g.
Polyol I: a sorbitol initiated polyether polyol of OH value 555 mg KOH/g.
Surfactant: a silicone surfactant.
Catalyst: a catalyst package
ISO: a polymeric MDI Example 1

Rigid polyurethane foams were made from a polyol composition and a polyisocyanate composition containing the ingredients listed below in Table 1. Cabinets and doors were produced in a wooden mould using cardboard as facer instead of metal sheet and plastic liners as used in a standard production. The lambda measurements at 10° C. were carried out under default conditions with a 20° C. difference between cold and hot plates according to standard ISO 8301 or ISO 2581.

The Reverse Heat Leakage (RHL) value was determined. The RHL value is the value determining the energy loss (heat transfer) through a refrigeration cabinet when a steady state of energy loss is reached and thus is a measurement determining the effectiveness of the thermal insulation of a refrigeration cabinet. The RHL test contains an insulated chamber in which a desired set temperature can be maintained. Electrical power is given to the heating elements inside the refrigerator to make the inside hotter than the outside. This creates a heat flow inside of the cabinet to the outside. After some time, steady state is reached (thermal equilibrium) and the power required to maintain this state is measured.

The average temperature difference is 45° C. for freezer sections and 20° C. for fridge sections.

The following table summarizes the compositions and results. Amounts are given in parts by weight. These results show that using isocyanate-reactive compositions according to the invention containing polyesters and aromatic amine-initiated polyether polyols lead to improvements in thermal insulation properties of the appliances containing the polyurethane foam.

TABLE 1

| | Formulations | | | |
|---|---|---|---|---|
| | 1 (Comp) | 2 | 3 | 4 |
| Polyol E | 17.5 | — | — | — |
| Polyol G | 56.5 | 34.5 | 34.5 | 34.5 |
| Polyol H | 20.0 | 10.0 | 10.0 | 10.0 |
| Polyol F | — | 30.0 | 30.0 | 30.0 |
| Polyol B | — | — | — | 20.0 |
| Polyol A | — | 20.0 | — | — |
| Polyol C | — | — | 20.0 | — |
| Surfactant | 2.0 | 2.0 | 2.0 | 2.0 |
| Catalyst | 1.8 | 1.5 | 1.5 | 1.5 |
| Water | 2.2 | 2.0 | 2.0 | 2.0 |
| Cyclopentane | 9.8 | 16 | 16 | 16 |
| ISO | 144 | 147 | 147 | 147 |
| Isocyanate Index (in %) | 110 | 115 | 115 | 115 |
| Lambda value (in mW/mK) | 20.56 | 19.05 | 19.60 | 19.60 |
| RHL improvement Fridge (%) | reference | −3.3 | −3.4 | −2 |
| RHL improvement Freezer (in %) | reference | −1.5 | −4.4 | −2.3 |

Example 2

Rigid polyurethane foams were made from a polyol composition and a polyisocyanate composition containing the ingredients listed below in Table 2. Cabinets and doors were produced in a wooden mould using cardboard as facer instead of metal sheet and plastic liners as used in a standard production.

The lambda measurements at 10° C. and RHL measurements were carried out as described above for Example 1.

The following table summarizes the compositions and results. Amounts are given in parts by weight.

These results show that using PET polyester polyols (formulation 7) instead of phthalic acid based polyester polyols (formulation 6) leads to a further improvement in energy consumption.

TABLE 2

| | Formulations | | |
|---|---|---|---|
| | 5 (reference) | 6 | 7 |
| Polyol G | 17.3 | 34.5 | 34.5 |
| Polyol E | 37.7 | | |
| Polyol I | 36.5 | | |
| Polyol F | | 29.7 | 29.7 |
| Polyol H | 2.7 | 10 | 10 |
| Polyol C | | | 20 |
| Polyol B | | 20 | |
| Surfactant | 1.5 | 2 | 2 |
| Catalyst | 2.2 | 0.9 | 0.9 |
| Water | 2.1 | 2 | 2 |
| Cyclopentane | 9.1 | 14 | 14 |
| Isopentane | 3.9 | | |
| ISO | 146.3 | 146.5 | 147 |
| Isocyanate index (%) | 110 | 115 | 115 |
| Lambda Value (mW/mK) | 20.2 | 19.5 | 19.5 |
| RHL improvement fridge (in %) | reference | −4.87 | −5.15 |
| RHL improvement freezer (in %) | reference | −2.88 | −5.48 |
| Energy Consumption improvement (%) | reference | −3 | −4 |

What is claimed:

1. A process for making rigid polyurethane or urethane-modified polyisocyanurate foams comprising the step of reacting an organic polyisocyanate composition with an isocyanate-reactive composition in the presence of a hydrocarbon as a blowing agent, characterised in that the isocyanate-reactive composition consists of (i) between 3 and 30 wt % of polyester polyols derived from side streams, waste or scrap residues from the manufacture of DMT and/or PET; (ii) between 20 and 50 wt % of polyether polyols obtained from reacting propylene oxide with aromatic amine initiators containing at least 2 active hydrogens per molecule; optionally, (iii) a non-aromatic amine initiated polyether polyol; and, optionally, (iv) water; and wherein when component (iii) is present, component (ii) is present in an amount ranging from 30 and 50 wt % and component (iii) is present at an amount ranging from 30 and 50 wt %; and wherein the amounts being calculated on the basis of total isocyanate-reactive compound.

2. The process according to claim 1, wherein when component (iii) is present, component (i) is present in an amount ranging from 10 and 20 wt %.

3. The process according to claim 1, wherein when component (iii) is not present, component (ii) is present in an amount from 25 and 50 wt %.

4. The process according to claim 3 wherein component (ii) is present in an amount ranging from 25 and 40 wt %.

5. The process according to claim 1 wherein the aromatic amine is DADPM.

6. The process according to claim 1 wherein water is also present in an amount of between 1.8 and 2.6 wt %.

7. The process according to claim 1 wherein the hydrocarbon blowing agent comprises cyclopentane.

8. The process according to claim 1 wherein the isocyanate index is from 85 to 150%.

9. An isocyanate-reactive composition consisting of (i) between 3 and 30 wt % of polyester polyols derived from side streams, waste or scrap residues from the manufacture of DMT and/or PET; (ii) between 20 and 50 wt % of polyether polyols obtained from reacting propylene oxide with one or more aromatic amine initiators containing at least 2 active hydrogens per molecule; and, optionally, (iii) a non-aromatic amine initiated polyether polyol, wherein when component (iii) is present, component (ii) is present at a range between 30 and 50 wt % and component (iii) is present at a range between 30 and 50 wt %; and wherein the amounts being calculated on the basis of total isocyanate-reactive compound.

10. The composition according to claim 9, wherein when component (iii) is present, component (i) is present in an amount ranging from 10 and 20 wt %.

11. The composition according to claim 9, wherein when component (iii) is not present, component (ii) is present in an amount ranging from 25 and 40 wt %.

12. The composition according to claim 11 wherein component (ii) is present in an amount ranging from 25 and 40 wt %.

13. The composition according to claim 9 further comprising water in an amount of between 1.8 and 2.6 wt %.

14. The composition according to claim 9 further comprising a hydrocarbon blowing agent.

15. A process for making rigid polyurethane or urethane-modified polyisocyanurate foams comprising the step of reacting an organic polyisocyanate composition with an isocyanate-reactive composition in the presence of a hydrocarbon as a blowing agent, characterised in that the isocyanate-reactive composition consists of: (i) between 3 and 30 wt % of polyester polyols derived from side streams, waste or scrap residues from the manufacture of DMT and/or PET; (ii) between 20 and 50 wt % of polyether polyols obtained from reacting propylene oxide with an aromatic amine initiators containing at least 2 active hydrogens per molecule, (iii) and between 30 and 50 wt % non-aromatic amine initiated polyether polyol, the amounts being calculated on the basis of total isocyanate-reactive compound.

16. The process according to claim 15, wherein the aromatic amine initiator is selected from the group consisting of tolylene diamine, diaminodiphenylmethane, and polymethylene polyphenylene polyamines.

17. The process according to claim 1 wherein the aromatic amine is selected from the group consisting of tolylene diamine, diaminodiphenylmethane and polymethylene polyphenylene polyamines.

18. The composition according to claim 9 wherein the aromatic amine is selected from the group consisting of tolylene diamine, diaminodiphenylmethane and polymethylene polyphenylene polyamines.

* * * * *